United States Patent [19]
Matsuoka

[11] Patent Number: 5,515,389
[45] Date of Patent: May 7, 1996

[54] TIMING SIGNAL EXTRACTING CIRCUIT SUITABLE FOR CMI SIGNALS

[75] Inventor: Isao Matsuoka, Tokyo, Japan

[73] Assignee: NEC Corporation, Japan

[21] Appl. No.: 200,768

[22] Filed: Feb. 23, 1994

[30] Foreign Application Priority Data

Feb. 24, 1993 [JP] Japan .................................. 5-059672

[51] Int. Cl.[6] .......................... G06F 11/00; H03M 13/00
[52] U.S. Cl. .............................................. 371/56; 375/359
[58] Field of Search ................................ 371/56, 55, 61, 371/62; 375/110, 95, 25, 49

[56] References Cited

U.S. PATENT DOCUMENTS

| | | | |
|---|---|---|---|
| 4,837,782 | 6/1989 | Sasaki | 395/95 |
| 5,195,110 | 3/1993 | Gorshe | 375/110 |

FOREIGN PATENT DOCUMENTS 3-145834  6/1991  Japan.

*Primary Examiner*—Robert W. Beausoliel, Jr.
*Assistant Examiner*—Ly V. Hua
*Attorney, Agent, or Firm*—Ostrolenk, Faber, Gerb & Soffen

[57] ABSTRACT

A timing extracting circuit according to the present invention includes a trailing edge detection circuit for detecting a trailing edge of a CMI signal. A trailing edge detection pulse is supplied to an AND gate and to a series circuit composed of a 3/2T delay circuit and a 2T delay circuit through an inverter. A 3/2T delayed, a T delayed and a 2T delayed outputs are supplied to the AND gate whose output is supplied to an OR gate and a 9T delay circuit. A T to 9T delayed outputs of the 9T delay circuit are also supplied to the OR gate and an extracted clock is obtained at an output of the OR gate. Trailing edge detection pulse of violation is removed by the AND gate and the thus removed regular detection pulse is supplemented by the OR gate.

6 Claims, 4 Drawing Sheets

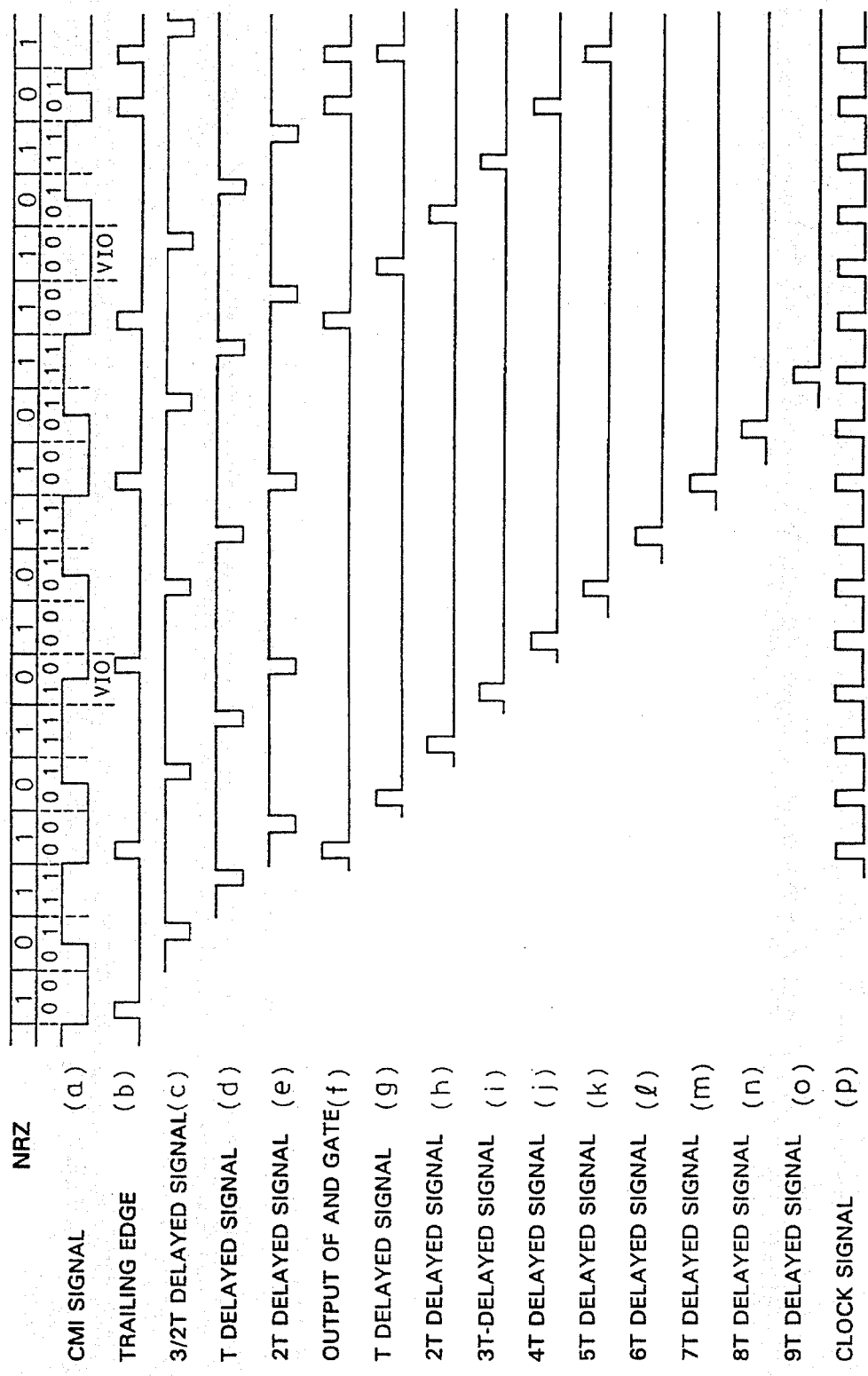

5,515,389

TIMING SIGNAL EXTRACTING CIRCUIT SUITABLE FOR CMI SIGNALS

BACKGROUND OF THE INVENTION

The present invention relates to a timing signal extracting circuit for a coded mark inversion (CMI) signal and, particularly, to a timing extracting circuit for such CMI signal containing CMI rule violation in a CMI code strain.

With an increased speed of information processing caused by recent development of information processing devices, improvement on efficiency and speed of data transmission between information processing devices have been requested. In view of these requests, the optical transmission has been utilized in which high speed data is transmitted through optical fibers. In general, in order to transmit data, the data is converted into a transmitting code train suitable for transmission through a transmission path such as optical fibers.

CMI code is one of these transmitting code trains, whose coding rule is as follow: that is, an input data "0" to be transmitted is converted into "01" and an input data "1" is converted alternatively into "00" and "11". On a decoding side, "01" is decoded to "0", a series of alternating "00" and "11", without "01" is decoded to "1" and otherwise be violation.

An example of violation is a sectioning information for indicating sections of data to be transmitted or other information such as those to be superimposed.

Japanese Patent Application Laid-open No. Hei 3-145834 discloses an example of a construction of a clock timing extracting circuit for a CMI signal train containing violation.

In the conventional construction of the timing extracting circuit for CMI code, however, it is based on that CMI code includes CMI coded signals "0" and "1" which occur at least twice preceeding its violation. Therefore, when a service data signal which is very low compared with a transmission speed of a main signal is transmitted by violation of the CMI code train, it is impossible to extract a timing exactly.

SUMMARY OF THE INVENTION

An object of the present invention is to provide a timing extracting circuit for extracting a timing signal of the CMI code, which is capable of extracting the timing precisely regardless of the relation between the CMI code and the violation.

The timing extracting circuit of the present invention utilizes the fact that an interval between a normal training edge of the CMI signal and a trailing edge due to "10" of violation is (½)T at maximum. The timing extracting circuit according to the present invention includes a detection pulse producing circuit for producing a detection pulse by detecting a timing of level change of the CMI code train. A ½T delay circuit delays the detection pulse by ½T (where T is a period of the clock signal). A 2T delay circuit further delays the ½T delayed pulse by T and 2T to produce a T delayed pulse and a 2T delayed pulse. An unnecessary pulse removing circuit removes unnecessary pulse components contained in the detection pulse by using the ½T delayed pulse, the T delayed pulse and the 2T delayed pulse. A 9T delay circuit delays the output of the unnecessary pulse removing circuit by T, 2T, 3T, 4T, 5T, 6T, 7T, 8T and 9T to produce a T delayed pulse, a 2T delayed pulse, a 3T delayed pulse, a 4T delayed pulse, a 5T delayed pulse, a 6T delayed pulse, a 7T delayed pulse, an 8T delayed and a 9T delayed pulse. An output circuit derives at least one of the output of the removing circuit and the T to 9T delayed pulses as an extracted clock when the at least one is produced.

BRIEF DESCRIPTION OF THE DRAWINGS

FIG. 4 is a timing chart for explaining the operation of the timing extracting circuit shown in FIG. 3.

DETAILED DESCRIPTION OF THE PREFERRED EMBODIMENT

The present invention will be described in detail with respect to the accompanying drawings.

Figure 1:
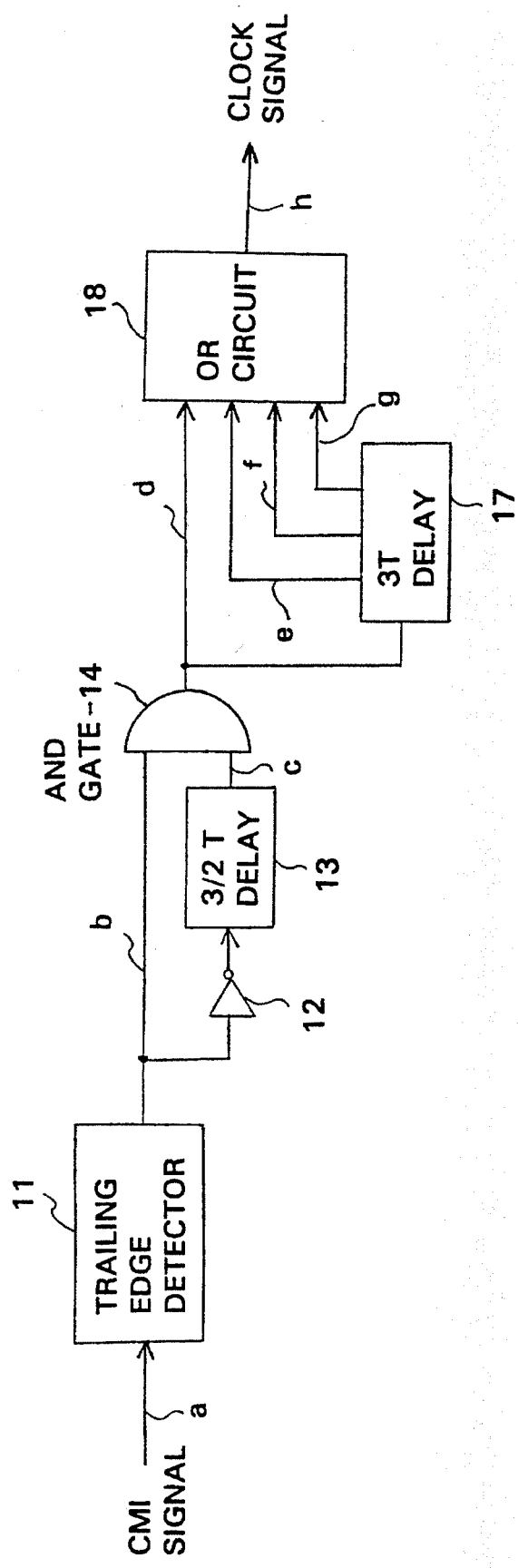
FIG. 1 is a block diagram of a conventional timing extracting circuit for CMI signal.
Figure 2:
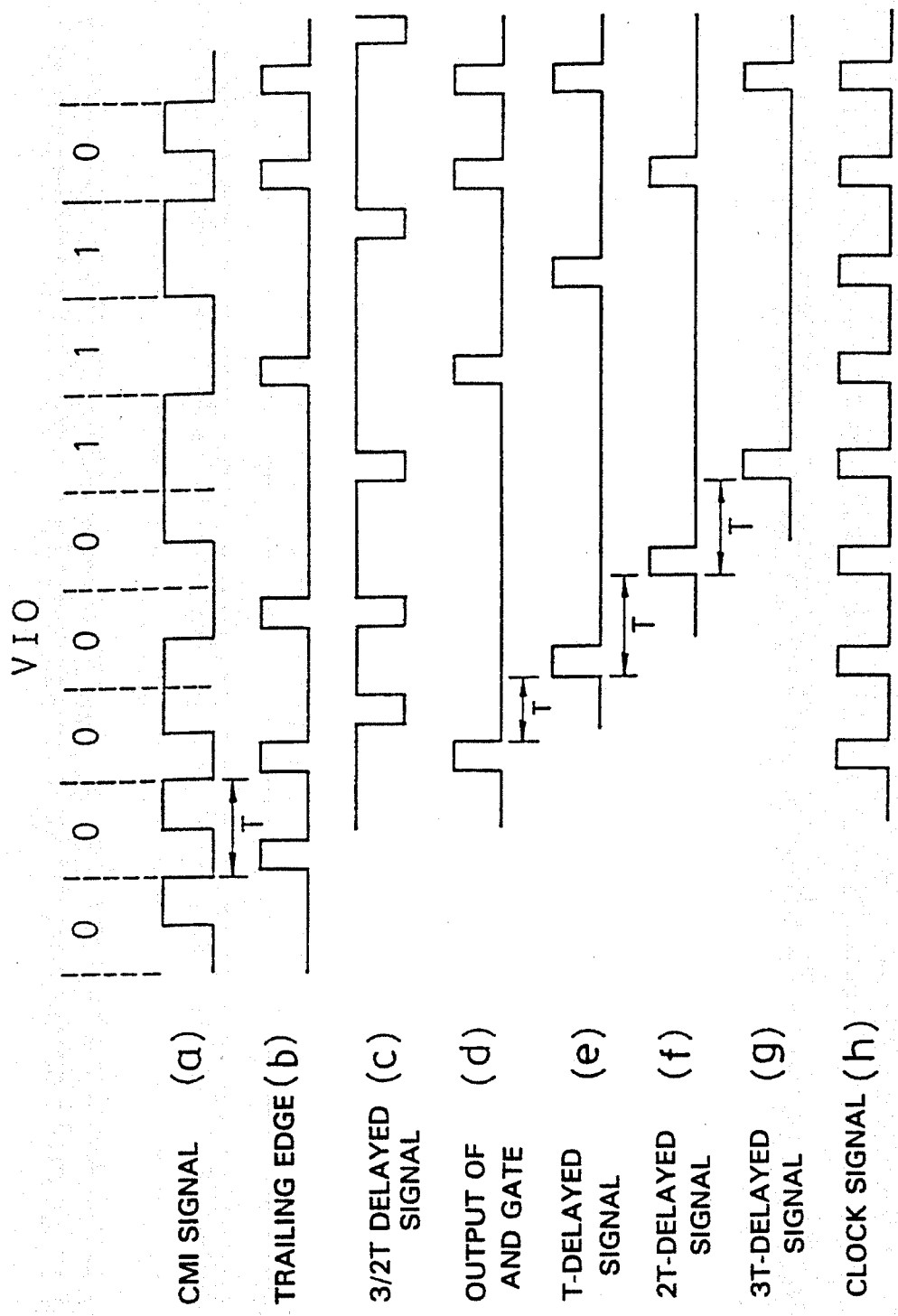
FIG. 2 is a timing chart for explaining the operation of the timing extracting circuit shown in FIG. 1.

In order to facilitate an understanding of the present invention, the timing extracting circuit described in the aforementioned article is described with reference to FIGS. 1 to 2. In FIGS. 1, 2(a) to 2(p), a CMI signal (a) is input to a trailing edge detection circuit 11 to detect trailing edges of respective codes of the code train to thereby produce detection pulses (b) corresponding to the respective trailing edges. The detection pulse (b) is supplied to one input of an AND gate 14 and to a (³⁄₂)T delay circuit 13 through an inverter 12, where T indicates a period of a clock component (timing component to be extracted) contained in the CMI code train (a). An output (c) of the delay circuit is supplied to the other input of the AND gate 14.

An output (d) of the AND gate 14 is supplied to one input of a 4-input OR gate 18 and to a 3T delay circuit 17. The 3T delay circuit 17 produces a delay output (e) which is delayed by t, a delay output (f) which is delayed by 2T and a delay output (g) which is delayed by 3T. The delay outputs (e) to (g) are supplied to the remaining inputs of the OR gate 18. An output (h) of the OR gate 18 is an aimed extracting clock signal.

When the CMI code train (a) such as shown in FIG. 2(a) is input to the trailing edge detection circuit 11, the trailing edge detection pulse (b) has a waveform shown in FIG. 2(b). It is assumed that a violation indicated by VIO is included in the CMI signal train (a) as a super-position of "01". The detection pulse (b) is inverted by the inverter 12 and delayed by (³⁄₂)T and supplied to one input (c) of the AND gate 14 whose the other input is supplied with the trailing edge detection pulse (b) directly. Therefore, in the AND gate 14, the trailing edge signal is removed due to violation VIO contained in the CMI code train (a).

An output (d) of the AND gate 14 has a waveform such as shown in FIG. 2(d) which is supplied to the OR gate 18 together with the outputs (d) delayed by T, 2T and 3T, respectively. Therefore, the clock component of the CMI code train (a) is extracted as the output (h) of the OR gate 18, as shown in FIG. 2(h). In this conventional circuit, however, it is impossible to detect an exact timing signal when a low speed service data signal is transmitted by violation of CMI code train, as mentioned previously.

Figure 3:
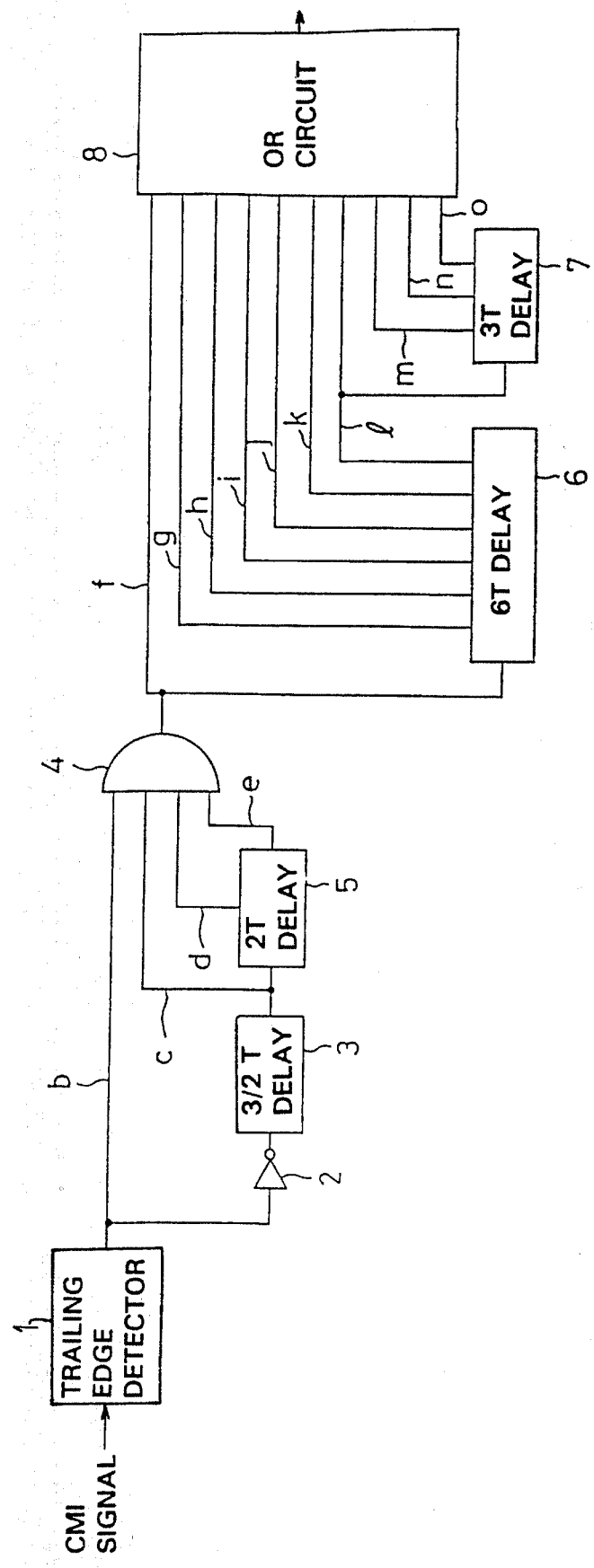
FIG. 3 is a block diagram of an embodiment of the present invention.

FIG. 3 is a block diagram of an embodiment of the present invention and FIGS. 4(a) to 4(p) show waveforms at various points in the circuit. In these figures, a CMI code train (a) is a signal obtained by coding NRZ data to be transmitted in which violation is included as shown by VIO in FIG. 4(a).

The CMI code signal (a) is input to a trailing edge detection circuit 1 and a detection pulse (b) from the detection circuit 1 is supplied to one input of an AND gate 4 and to a (3/2)T delay circuit 3 through an inverter 2. An output (c) of the (3/2)T delay circuit 3 is supplied to another input of the AND gate 4 and to a 2T delay circuit 5. The 2T delay circuit 5 is to delay its input (c) by T and 2T, respectively, and a T-delayed output (d) and a 2T-delayed output (e) are supplied to respective other inputs of the AND gate 4.

An output (f) of the AND gate 4 is supplied to one input of an OR gate 8 and to an input of a 6T delay circuit 6. The 6T delay circuit 6 delays the input (f) by T, 2T, 3T, 4T, 5T and 6T, respectively to produce delayed outputs (g) to (l) which are supplied to corresponding inputs of the OR gate 8.

The 6T delayed output (l) of the 6T delay circuit is supplied to an input of a 3T delay circuit 7 in which it is delayed by T, 2T and 3T, resulting in outputs (m), (n) and (o) which are supplied to respective remaining inputs of the OR gate 8. An output (p) of the OR gate 8 is used as the timing extracting clock for the CMI signal. It should be noted that the delay circuits 3, 5, 6 and 7 may comprise delay lines.

The detection pulse of the trailing edge detection circuit 1 due to "10" of the violation VIO is removed by the inverter 2, the (3/2)T delay circuit 3, the 2T delay circuit 5 and the AND gate 4. An interval between a regular trailing edge of the CMI signal and the trailing edge due to violation "10" is (7/2)T at maximum. Therefore, in order to accommodate this, the 2T delay circuit 5 is provided in addition to the (3/2)T delay circuit 3.

However, there may be a case where, due to the above-mentioned construction (existence of the AND gate 4, etc.), no detection pulses exists in the output (f) of the AND gate 4 during a period of 9T at maximum since regular trailing edge detection pulses are removed in addition to the trailing edge detection pulse of the violation "10". Therefore, in this embodiment, the output (f) of the AND gate 4 is delayed further by 9T at maximum by using the 6T delay circuit 6 and the 3T delay circuit 7 and the T to 9T delayed outputs (g) to (o) are input to the OR gate 8 together with the output (f) of the AND gate 4.

With the construction mentioned above, it becomes possible to extract the clock exactly without influence of violation, regardless of relation between the CMI code and violation and regardless of existence or absence of violation code.

What is claimed is:

1. A timing extracting circuit for extracting clock component from a CMI code train, comprising:

detection means producing a detection signal by detecting a timing of level change of the CMI code train;

3/2T delay means receiving and delaying the detection signal of the detection means by 3/2T to produce a 3/2T delayed signal where T is a period of the clock component;

2T delay means receiving and delaying the 3/2T delayed signal from the 3/2T delay means by T and 2T to produce a T delayed signal and a 2T delayed signal;

removing means receiving and removing unnecessary signal components contained in the detection signal of the detection means by receiving and processing the 3/2T delayed signal, the T delayed signal and the 2T delayed signal;

9T delay means receiving and delaying an output of said removing means by T, 2T, 3T, 4T, 5T, 6T, 7T, 8T and 9T to produce T to 9T delayed signals, and output means receiving the output of the removing means and the T to 9T delayed signals of the 9T delay means, and thereof providing at least one of the outputs of said removing means and the T to 9T delayed signals as an extracted clock signal.

2. A timing extracting circuit claimed in claim 1, wherein said detection signal producing means comprises a trailing edge detector for detecting a timing of trailing edge of the CMI code train.

3. A timing extracting circuit claimed in claim 2, wherein said 3/2T delay means comprises a logical sum circuit having an input provided by an inverter with the input being an inversion of the detection signal and wherein said removing means comprises a logical sum circuit having four inputs supplied with the detection signal, the 3/2T delayed signal, the T delayed signal and the 2T delayed signal, respectively.

4. A timing extracting circuit claimed in claim 3, wherein said removing means is an AND gate.

5. A timing extracting circuit claimed in claim 3, wherein said 9T delay means includes a 6T delay circuit and a 3T delay circuit, said 6T delay circuit receiving and processing the output of the logical sum circuit and outputting said T to 6T delayed signals, and said 3T delay circuit receiving and processing the 6T delayed signal and outputting the 7T to 9T delayed signals.

6. A timing extracting circuit claimed in claim 1, wherein said output means is an OR gate circuit.

\* \* \* \* \*